United States Patent
Wilson et al.

(10) Patent No.: US 10,852,395 B1
(45) Date of Patent: Dec. 1, 2020

(54) SENSOR ENCLOSURE AND GLASS PANELS FOR SENSOR ENCLOSURES

(71) Applicants: James R. Wilson, Cupertino, CA (US); Christopher D. Jones, Los Gatos, CA (US)

(72) Inventors: James R. Wilson, Cupertino, CA (US); Christopher D. Jones, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/353,241

(22) Filed: Mar. 14, 2019

Related U.S. Application Data

(60) Provisional application No. 62/666,955, filed on May 4, 2018, provisional application No. 62/643,783, filed on Mar. 16, 2018.

(51) Int. Cl.
*G03C 3/00* (2006.01)
*G01S 7/481* (2006.01)
(Continued)

(52) U.S. Cl.
CPC .......... *G01S 7/4813* (2013.01); *G01S 7/4972* (2013.01); *G01S 17/931* (2020.01); *G01S 2013/93274* (2020.01)

(58) Field of Classification Search
CPC ...... G01S 17/936; G01S 7/497; G01S 13/931; G01S 17/08; G01S 7/4813; G01S 7/4817; G01S 17/42; G01S 13/867; G01S 17/023; G01S 17/026; G01S 7/4863; G01S 7/481; G01S 7/484; G01S 13/86; G01S 7/4815; G01S 7/486; G01S 13/04; G01S 13/42; G01S 13/56; G01S 13/862; G01S 13/865; G01S 13/88; G01S 15/93; G01S 17/36; G01S 17/66; G01S 17/87; G01S 2007/027; G01S 2013/9375; G01S 7/411; G01S 15/8993; G01S 15/931; G01S 17/06;
(Continued)

(56) References Cited

U.S. PATENT DOCUMENTS

| 9,372,264 B1* | 6/2016 | Patel | H01L 25/50 |
| 2012/0243093 A1* | 9/2012 | Tonar | H01L 41/09 |
| | | | 359/507 |

(Continued)

FOREIGN PATENT DOCUMENTS

| WO | 2018094373 A1 | 5/2018 |
| WO | 2018115090 A1 | 6/2018 |

*Primary Examiner* — Mesfin T Asfaw
(74) *Attorney, Agent, or Firm* — Young Basile Hanlon & MacFarlane, P. C.

(57) ABSTRACT

A vehicle includes an exterior body panel, an opening formed through the exterior body panel, a housing that is connected to the exterior body panel, wherein the housing includes side walls that extend around an enclosed space and an open front portion that is positioned at the opening formed through the exterior body panel, an optical-grade tempered glass panel that is connected to the housing and positioned at the opening that is formed through the exterior body panel, an emissive sensor component that is located in the enclosed space that is defined by the housing and the optical-grade tempered glass panel, and a receptive sensor component that is located in the enclosed space that is defined by the housing and the optical-grade tempered glass panel.

23 Claims, 4 Drawing Sheets

(51) Int. Cl.
   *G01S 7/497*     (2006.01)
   *G01S 17/931*    (2020.01)
   *G01S 13/931*    (2020.01)

(58) Field of Classification Search
   CPC .......... G01S 17/50; G01S 17/58; G01S 17/93;
                 G01S 19/40; G01S 19/42; G01S
             2015/937; B60R 11/04; B60R 2011/004;
                B60R 16/0232; B60R 19/24; B60R
                2021/01027; B60R 2021/01286; B60R
                21/0132; B60R 21/01536; C03C 17/25;
             C03C 17/02; C03C 21/002; C03C 3/085;
                           C03C 3/091; C03C 17/245
   See application file for complete search history.

(56)           References Cited

U.S. PATENT DOCUMENTS

2016/0282468 A1*   9/2016   Gruver .................. G01S 7/4817
   2018/0011173 A1    1/2018   Newman
   2018/0284233 A1   10/2018   Nichols et al.
   2019/0330104 A1* 10/2019   Kajioka .................. C03C 17/25

* cited by examiner

SENSOR ENCLOSURE AND GLASS PANELS FOR SENSOR ENCLOSURES

CROSS-REFERENCE TO RELATED APPLICATIONS

This application claims the benefit of U.S. Provisional Application No. 62/643,783, filed on Mar. 16, 2018, and U.S. Provisional Application No. 62/666,955, filed on May 4, 2018. The contents of the foregoing applications are incorporated herein by reference in their entireties for all purposes.

FIELD

The present disclosure relates generally to enclosures for sensors used in vehicle applications.

BACKGROUND

Autonomous vehicles include control systems that determine a trajectory and control actuators that cause the vehicle to move along the trajectory. These systems may fully control the vehicle without control by a human driver, or may control some aspects of vehicle motion during control by a human driver (e.g., lane keeping or following distance control). Inputs from sensors are used by the control systems to obtain information regarding the environment around the vehicle.

SUMMARY

One aspect of the disclosure is a sensor enclosure. The sensor enclosure includes a housing, an optical-grade tempered glass panel that is connected to the housing, and one or more sensors located in an enclosed space that is defined by the housing and the optical-grade tempered glass panel.

Another aspect of the disclosure is a vehicle. The vehicle includes an exterior body panel, an opening formed through the exterior body panel, and a housing that is connected to the exterior body panel. The housing includes side walls that extend around an enclosed space and an open front portion that is positioned at the opening formed through the exterior body panel. An optical-grade tempered glass panel is connected to the housing and positioned at the opening that is formed through the exterior body panel. An emissive sensor component is located in the enclosed space that is defined by the housing and the optical-grade tempered glass panel and a receptive sensor component is located in the enclosed space that is defined by the housing and the optical-grade tempered glass panel.

In some implementations of the vehicle, a front surface of the optical-grade tempered glass panel is aligned with the exterior body panel, the housing is disposed behind the exterior body panel, the exterior body panel is a bumper, the emissive sensor component is operable to generate an emitted signal and transmit the emitted signal through the optical-grade tempered glass panel, the receptive sensor component is operable to detect a received signal that is transmitted through the optical-grade tempered glass panel from an environment, and the received signal is a reflected portion of the emitted signal.

In some implementations of the vehicle, a front surface of the optical-grade tempered glass panel is aligned with the exterior body panel. In some implementations of the vehicle, the emissive sensor component is operable to generate an emitted signal and transmit the emitted signal through the optical-grade tempered glass panel. In some implementations of the vehicle, the receptive sensor component is operable to detect a received signal that is transmitted through the optical-grade tempered glass panel from an environment. In some implementations of the vehicle, the received signal is a reflected portion of the emitted signal.

In some implementations of the vehicle, the optical-grade tempered glass panel is a laminated structure that includes a first glass layer and a second glass layer that are connected by a transparent interlayer that is located between the first glass layer and the second glass layer. In such an implementation, the transparent interlayer may be formed from polyvinyl butyral. In addition, in such an implementation a front surface of the optical-grade tempered glass panel may be aligned with the exterior body panel, the housing may be disposed behind the exterior body panel, the exterior body panel may be a bumper, the emissive sensor component may be operable to generate an emitted signal and transmit the emitted signal through the optical-grade tempered glass panel, the receptive sensor component may be operable to detect a received signal that is transmitted through the optical-grade tempered glass panel from an environment, and the received signal may be a reflected portion of the emitted signal.

In some implementations of the vehicle, the housing is disposed behind the exterior body panel. In some implementations of the vehicle, the exterior body panel is a bumper. In some implementations of the vehicle, the optical-grade tempered glass panel is curved.

In some implementations of the vehicle, the vehicle includes a motion control system that is operable to cause motion based on an output signal from the receptive sensor component.

In some implementations of the vehicle, the vehicle includes a motion control system that includes a controller and actuators, wherein the controller receives an output signal from the receptive sensor component, the controller makes a motion control decision based on the output signal, and the controller transmits a motion control command to the actuators to cause operation of the actuators.

Another aspect of the disclosure is a method that includes forming an optical-grade glass panel, shaping the optical-grade glass panel, cutting the optical-grade glass panel, tempering the optical-grade glass panel, and polishing the optical-grade glass panel subsequent to tempering. Some implementations of the method also include installing the optical-grade glass panel in a housing to define a sensor enclosure that has an enclosed space that is defined between the optical-grade glass panel and the housing, wherein an emissive sensor component is located in the enclosed space and a receptive sensor component is located in the enclosed space that is defined by the housing and the optical-grade glass panel. Some implementations of the method also include installing the sensor enclosure in a vehicle, wherein the vehicle includes a motion control system that includes a controller and actuators, the controller receives an output signal from the receptive sensor component, the controller makes a motion control decision based on the output signal, and the controller transmits a motion control command to the actuators to cause operation of the actuators to control motion of the vehicle.

Another aspect of the disclosure is a method that includes forming an optical-grade glass panel, shaping the optical-grade glass panel, cutting the optical-grade glass panel, polishing the optical-grade glass panel prior to tempering, and tempering the optical-grade glass panel. Some implementations of the method also include installing the optical-grade glass panel in a housing to define a sensor enclosure that has an enclosed space that is defined between the optical-grade glass panel and the housing, wherein an emissive sensor component is located in the enclosed space and a receptive sensor component is located in the enclosed space that is defined by the housing and the optical-grade glass panel. Some implementations of the method also include installing the sensor enclosure in a vehicle, wherein the vehicle includes a motion control system that includes a controller and actuators, the controller receives an output signal from the receptive sensor component, the controller makes a motion control decision based on the output signal, and the controller transmits a motion control command to the actuators to cause operation of the actuators to control motion of the vehicle.

DETAILED DESCRIPTION

The present disclosure describes enclosures for sensors used in vehicle applications, including glass panels that enclose and protect the sensors within the enclosures. The sensors can include, as examples, visible spectrum cameras, infrared cameras, infrared emitters, and lidar sensors (which include emitters and detectors). Signals emitted by and received by the sensors are generally in the form of electromagnetic radiation, either in the visible portion or the invisible portion of the electromagnetic spectrum.

Some sensors are not tolerant to signal degradation that may occur when emitted and/or received signals pass through glass, plastic, or other signal transmissive materials. Optical grades of glass (herein, "optical-grade glass") have controlled refraction, dispersion (e.g., Abbe values greater than 63), low inclusions (e.g., <0.04 mm2/100 cm3) and transmission characteristics (% T>90% uncoated in wavelength of interest), and can be used in sensor applications to avoid signal degradation. One example of glass that is consistent with the characteristics of optical-grade glass, as used in this disclosure, is n-BK7, manufactured by Schott AG. Other equivalent windows could be made from S-BSL7 manufactured by Ohara Corporation, or H-K9L manufactured by CDGM Glass Company Ltd.

The sensor enclosures described herein incorporate optical-grade glass and configurations that enhance safety during a collision in which the glass is broken. In some implementations, optical-grade glass is tempered to enhance safety during a collision in which the glass is broken. In some implementations, two or more layers of optical-grade glass are laminated using a transparent interlayer to enhance safety during a collision in which the glass is broken.

Figure 1:
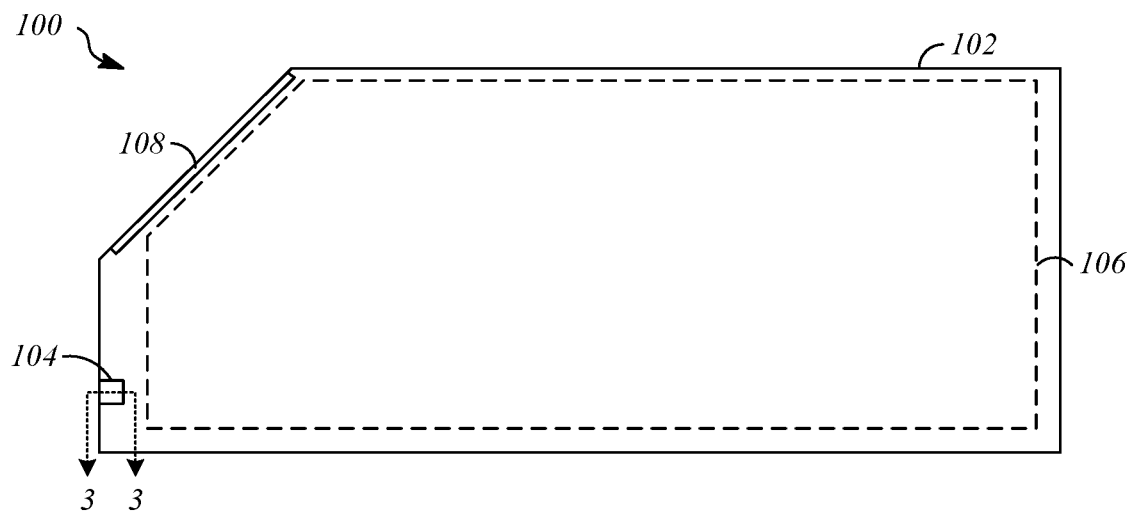
FIG. 1 is an illustration that shows a vehicle.

FIG. 1 is an illustration that shows a vehicle 100. The vehicle 100 includes a body 102, a sensor enclosure 104, a passenger compartment 106, a front window 108 (i.e., windshield). The sensor enclosure 104 is positioned on and disposed behind an external panel of the body 102 of the vehicle 100. The passenger compartment 106 is separate from the sensor enclosure 104, and provides a space in which people and/or cargo can be carried by the vehicle 100. The front window 108 is configured to allow viewing of the environment outside of the vehicle 100 by, for example, persons who are located in the passenger compartment 106 of the vehicle 100.

The vehicle 100 may be any type of vehicle, such as a road-going vehicle, an aerial vehicle, an off-road vehicle, or a mobile robot of any type. As an example, the vehicle 100 may be a road-going automobile such as a passenger car.

Figure 2:
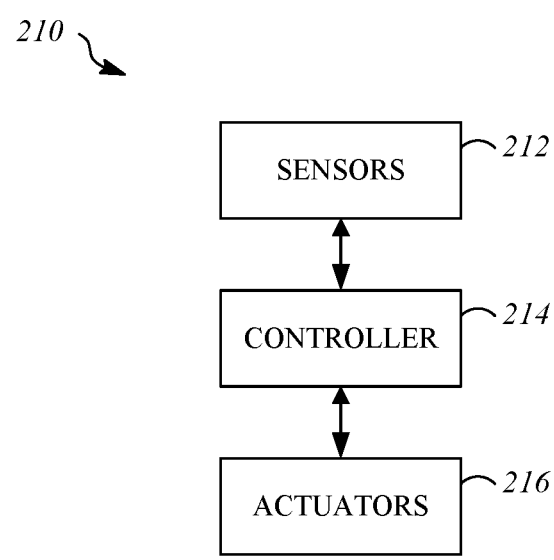
FIG. 2 is a block diagram that shows motion control systems of the vehicle.

FIG. 2 is a block diagram that shows motion control systems 210 of the vehicle 100. The motion control systems 210 include sensors 212, a controller 214, and actuators 216. The sensors 212 are operable to output signals representing states for the environment around the vehicle 100 and objects in the environment around the vehicle 100. Some or all of the sensors 212 may be located in the sensor enclosure 104. The sensors 212 may include, as examples, a visible spectrum camera, a visible spectrum illuminator, an infrared camera, an infrared illuminator, a lidar sensor, a radar sensor, an ultrasonic sensor, and a structured light sensor. The controller 214 is operable to make decisions regarding motion of the vehicle, and is operable to determine commands that will cause the actuators 216 to cause the vehicle 100 to move in accordance with those decisions. The actuators 216 may include, as examples, propulsion, steering, braking, and suspension actuators.

As will be explained herein, the motion control systems 210 may be operable to cause motion based on an output signal from a receptive sensor component that is included in the sensors 212. Thus, in implementations where the motion control systems 210 include the controller 214 and the actuators 216, the controller 214 may receive the output signal from the receptive sensor component, the controller 214 may make a motion control decision based on the output signal, and the controller 214 may transmits a motion control command to the actuators 216 to cause operation of the actuators 216 in a manner that causes (e.g., initiates, changes, or controls) motion of the vehicle 100.

Figure 3:
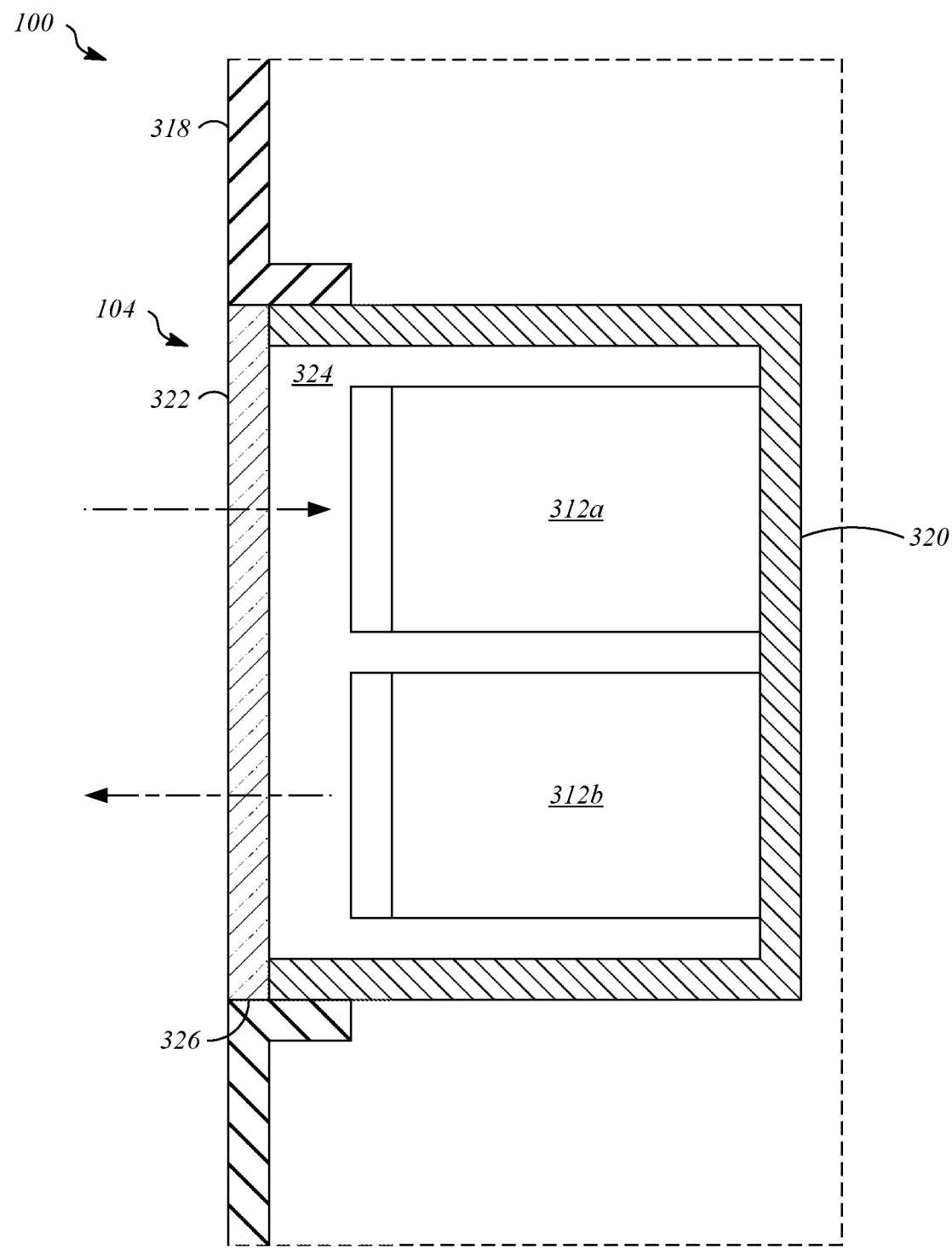
FIG. 3 is a cross section illustration that shows a portion of the vehicle including a sensor enclosure.

FIG. 3 is a cross section illustration that shows a portion of the vehicle 100 including the sensor enclosure 104. The vehicle 100 includes an exterior panel 318 (i.e., an exterior body panel). The exterior panel 318 may be made of plastic, metal, or other materials, and is visible from the exterior of the vehicle 100. The exterior panel 318 is an opaque structure that may be connected to and may conceal underlying portions of the body 102 of the vehicle 100, such as a unibody, a frame member, or a bumper beam. In the illustrated implementation, the exterior panel 318 is located at a front end of the vehicle 100. As an example, the exterior panel 318 may be a portion of a bumper, such as a bumper cover.

The sensor enclosure 104 includes a housing 320 and a glass panel 322. The housing 320 is a structure that defines an enclosed space 324. As an example, the housing 320 may include side walls that extend around the enclosed space 324 except at an open front portion of the housing 320, where the glass panel 322 is located.

The housing 320 and/or the glass panel 322 are located in and/or extend through an opening 326 that is formed through the exterior panel 318, such all of or substantially all of the opening 326 is occupied by the sensor enclosure 104 and/or the glass panel 322. In some implementations, a front surface of the glass panel 322 may be aligned with or substantially aligned with the exterior panel 318. For example, a front surface of the glass panel 322 may be aligned with a front surface of the exterior panel 318.

The glass panel 322 is formed from optical-grade glass in order to enhance transmission of sensor signals through the glass panel 322, including emitted signals and received signals. Multiple components of the sensors 212 may be located in the enclosed space 324 of the housing 320 of the sensor enclosure 104, such as a receptive sensor component 312a and an emissive sensor component 312b. The receptive sensor component 312a is a sensor component that detects the presence of (i.e., receives) a signal that is present in the surrounding environment and is transmitted to the receptive sensor component 312a through the glass panel 322. One example of a device that can be used as the receptive sensor component 312a is an infrared detector. The emissive sensor component 312b is a sensor component that generates (i.e., emits) a signal that is transmitted to the environment through the glass panel 322. The received signal that is sensed by the receptive sensor component 312a may be a reflected portion (e.g., reflected by objects in the environment) of the emitted signal that is emitted by the emissive sensor component 312b. One example of a device that can be used as the emissive sensor component 312b is an infrared emitter. Other devices can be used as the receptive sensor component 312a and the emissive sensor component 312b. Other sensor components may also be located in the enclosed space 324 of the housing 320 of the sensor enclosure 104.

The size of the glass panel 322 is selected in correspondence to the size of the opening 326. As an example, the size of the glass panel 322 may be, for example, between 50 millimeters and 500 millimeters.

In the implementation shown in FIG. 3, sensor components such as the receptive sensor component 312a and the emissive sensor component 312b are located in the enclosed space 324 of the housing 320. It should be understood that the sensor enclosure 104 can be implemented such that the housing 320 is omitted. As one example, sensor components such as the receptive sensor component 312a and the emissive sensor component 312b can be located in an enclosed space formed by the body 102 of the vehicle 100, such as an enclosed space that is an integral part of the exterior panel 318, such as a depression formed relative to the front surface of the exterior panel 318. As another example, the sensor components such as the receptive sensor component 312a and the emissive sensor component 312b can be located in an open space defined behind the exterior panel 318 and the glass panel 322. In this example, the receptive sensor component 312a and the emissive sensor component 312b can be supported by a structure that is located behind the exterior panel 318, such as a portion of the body 102 of the vehicle 100.

Figure 4:
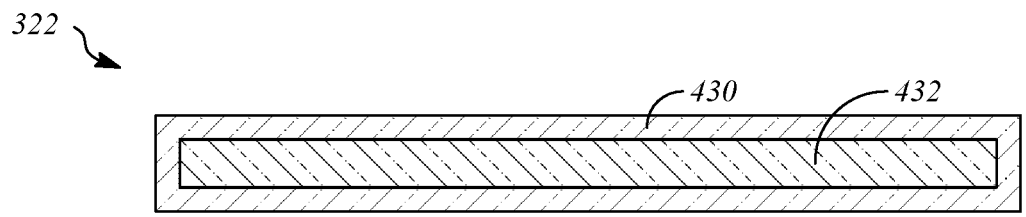
FIG. 4 is a cross section illustration of a glass panel of the sensor enclosure.

In the current example, the glass panel 322 is tempered to enhance safety in a collision during which the glass panel 322 is broken. FIG. 4 is a cross section illustration of the glass panel 322 of the sensor enclosure 104. The glass panel 322 includes a compression zone 430 and a tension zone 432. The compression zone 430 includes all of the exterior of the glass panel 322, such that all of the exterior surfaces of the glass panel 322 are under compression. Within the interior of the glass panel 322, tension forces are present in the tension zone 432. As an example, in an implementation in which the glass panel 322 has a thickness of four millimeters, the compression zone 430 may be one millimeter thick (as measured from an exterior surface of the glass panel 322 to the tension zone 432) and the tension zone 432 may be two millimeters thick.

The compressive forces in the compression zone 430 and the tension forces in the tension zone 432 combine to have an overall net stress of zero in the glass panel 322. When the glass panel 322 is broken, such as by introduction of a defect that extends through the compression zone 430 into the tension zone 432, the internal tensile stresses cause the glass panel 322 to break into a very large number of small pieces, reducing the likelihood of persons experiencing serious injuries as a result of contact with broken glass.

Figure 5:
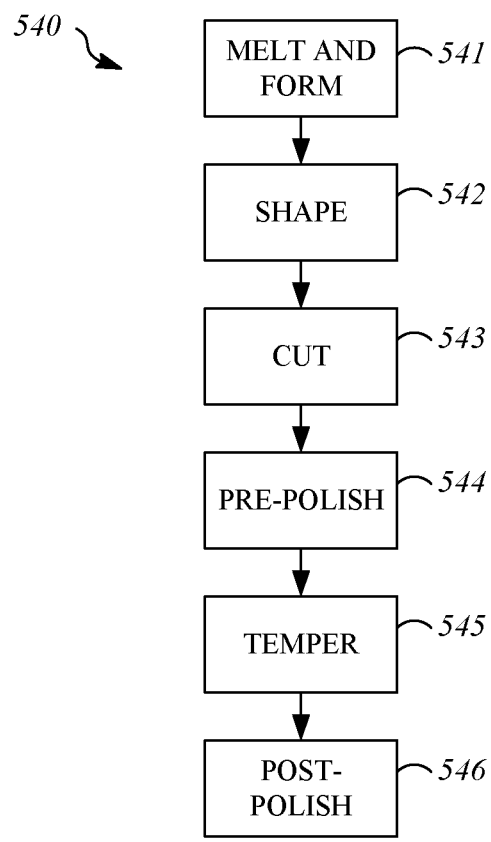
FIG. 5 is a flowchart that shows a process for producing the glass panel of the sensor enclosure.

FIG. 5 is a flowchart that shows a process for producing the glass panel 322 of the sensor enclosure 104. The glass panel 322 is produced by melting and forming in operation 541 by conventional methods, which include melting raw materials and forming by the float glass process or another suitable process. Other operations, such as homogenizing and refining, may be performed. Typical materials used in the manufacture of optical glasses include the oxides or carbonates of silicon, boron, magnesium, calcium, sodium, aluminum and other elements. The materials and methods used in operation 541 are selected to achieve optical-grade properties for the finished panel.

In operation 542, the glass panel is shaped, which may include curving the glass panel 322 by heating it such that it molds to conform to a curved steel form. In operation 543, which is optional, the glass panel 322 is cut. Cutting in operation 543 establishes the final size for the glass panel 322. In operation 544, which is optional, pre-polishing is performed prior to tempering. Pre-polishing removes surface defects to enhance the optical properties of the glass panel 322.

In operation 545, the glass panel 322 is tempered. Tempering the glass panel 322 includes heating the glass panel 322, rapidly cooling the surfaces of the glass panel 322, and slowly cooling the remainder of the glass panel 322.

As a result of the materials used to form the optical-grade glass for the glass panel 322, the coefficient of thermal expansion is low relative to soda-lime glass. As a result, tempering in operation 545 differs from conventional tempering as applied to soda-lime glass. To achieve breaking performance similar to that of tempered soda-lime glass, the temperature to which the glass panel 322 is initially heated is increased and/or the rate at which the surfaces of the glass panel 322 are cooled is increased. Thus, for example, air jets are used to cool the surfaces of the glass panel 322, and are placed at smaller spacings, in greater numbers, and at higher overall flow rates than in conventional soda-lime glass tempering methods. In addition, because cutting is performed in operation 543 prior to tempering, the size and spacing between handling components, such as rollers, is reduced, further increasing the need for high air flow to cool the surfaces of the glass panel 322.

Tempering in operation 545 can be configured to achieve a desired level of surface compression, such as, for example, 120 MPa. In addition, tempering can be tuned to any other compressive level to control strength and shard size as desired.

As an alternative, tempering may be performed in operation 545 by chemical tempering instead of heat tempering.

The tempering process of operation 545 may reduce the optical qualities of the glass panel 322. Therefore, post-polishing is performed in operation 546 to restore and/or enhance the optical properties of the glass panels such that optical-grade characteristics are achieved.

The optical-grade tempered glass panel produced according to the process of FIG. 5 may be integrated into a sensor enclosure, for example, by installing the optical-grade tempered glass panel in a housing to define a sensor enclosure that has an enclosed space that is defined between the optical-grade tempered glass panel and the housing, wherein an emissive sensor component is located in the enclosed space and a receptive sensor component is located in the enclosed space that is defined by the housing and the optical-grade glass panel. The sensor enclosure can be integrated into a vehicle, for example, by installing the sensor enclosure in a vehicle, such as one that includes a motion control system that includes a controller and actuators, wherein the controller receives an output signal from the receptive sensor component, the controller makes a motion control decision based on the output signal, and the controller transmits a motion control command to the actuators to cause operation of the actuators to control motion of the vehicle.

Figure 6:
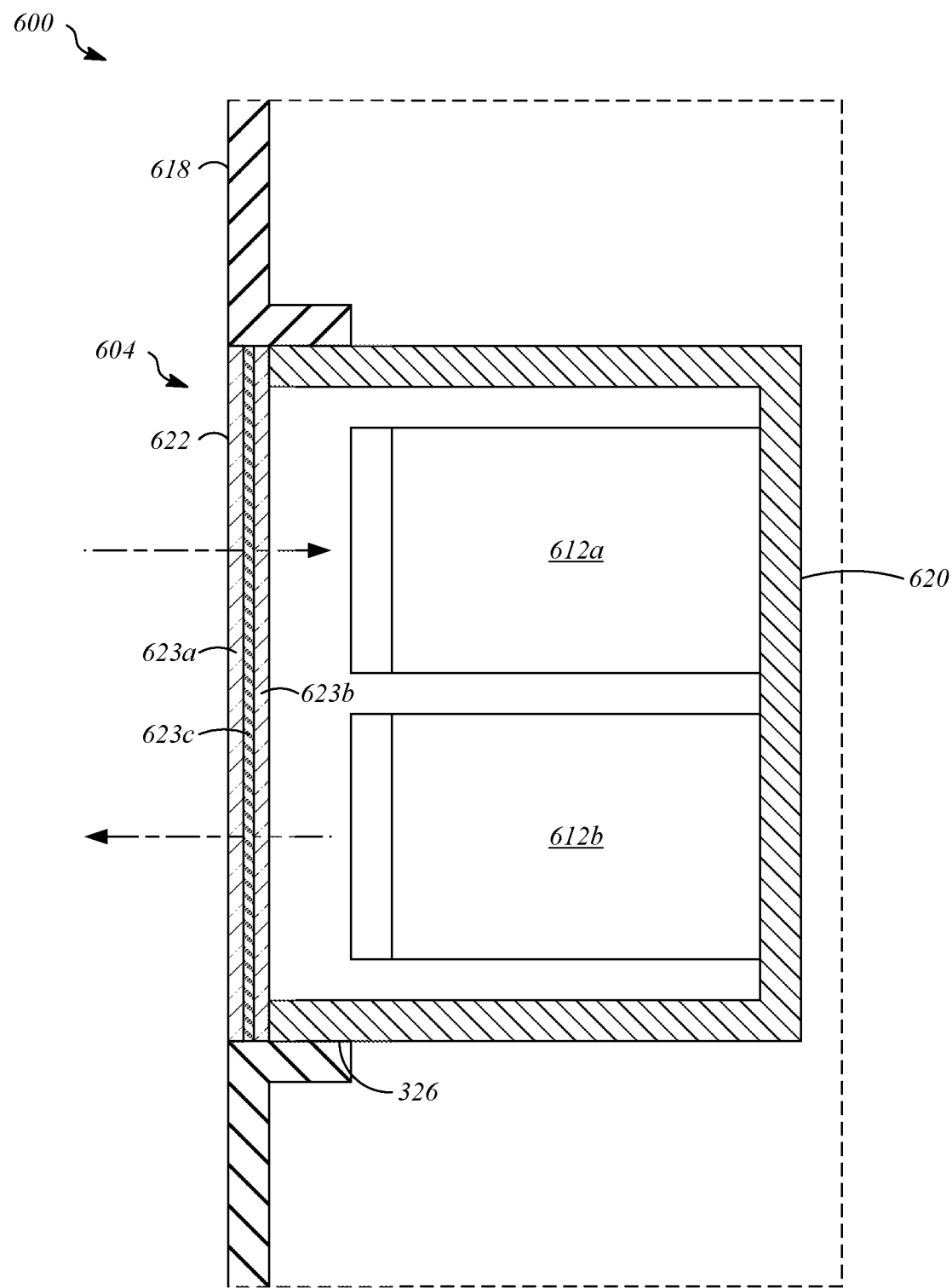
FIG. 6 is a cross section illustration that shows a portion of the vehicle including a sensor enclosure according to an alternative implementation.

FIG. 6 is a cross section illustration that shows a portion of a vehicle 600 including a sensor enclosure 604 according to an alternative implementation.

The vehicle 600 includes an exterior panel 618. The exterior panel 618 may be made of plastic, metal, or other materials, and is visible from the exterior of the vehicle 600. The exterior panel 618 is an opaque structure that may be connected to and may conceal underlying portions of the vehicle 600, such as a unibody, a frame member, or a bumper beam. In the illustrated implementation, the exterior panel 618 is located at a front end of the vehicle 600. As an example, the exterior panel 618 may be a portion of a bumper, such as a bumper cover.

The sensor enclosure 604 is located in an opening 626 that is formed through the exterior panel 618 and includes a housing 620, a glass panel 622, and an enclosed space 624 that is defined within the housing 620, all of which are similar to equivalent parts of the sensor enclosure 104 except as disclosed herein. Sensor components such as a receptive sensor component 612a and an emissive sensor component 612b are located in the housing 620 and are similar to the receptive sensor component 312a and the emissive sensor component 312b.

The glass panel 622 includes two or more layers of optical-grade glass that are laminated together to enhance safety during a collision in which the glass panel 622 is broken. In the illustrated example, the glass panel 622 includes a first glass layer 623a, a second glass layer 623b, and a transparent interlayer 623c. The first glass layer 623a and the second glass layer 623b are optical-grade glass, and may optionally be tempered separately prior to lamination in the manner described with respect to the glass panel 322. The first glass layer 623a and the second glass layer 623b are connected by the transparent interlayer 623c, which is located between them. The transparent interlayer 623c may be a transparent adhesive, such as polyvinyl butyral (PVB).

In the implementation shown in FIG. 6, sensor components such as the receptive sensor component 612a and the emissive sensor component 612b are located in the enclosed space 624 of the housing 620. It should be understood that the sensor enclosure 604 can be implemented such that the housing 620 is omitted. As one example, sensor components such as the receptive sensor component 612a and the emissive sensor component 612b can be located in an enclosed space formed within the vehicle 600, such as an enclosed space that is an integral part of the exterior panel 618, such as a depression formed relative to the front surface of the exterior panel 618. As another example, the sensor components such as the receptive sensor component 612a and the emissive sensor component 612b can be located in an open space defined behind the exterior panel 618 and the glass panel 622. In this example, the receptive sensor component 612a and the emissive sensor component 612b can be supported by a structure that is located behind the exterior panel 618.

As described above, one aspect of the present technology is the gathering and use of data available from various sources using sensors to control motion of a vehicle. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to enhance control of a vehicle based on user preferences.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide personal information. In yet another example, users can select to limit the length of time personal information data is maintained or entirely prohibit the storage of personal information. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A vehicle, comprising:
   an exterior body panel;
   an opening formed through the exterior body panel;
   a housing that is connected to the exterior body panel, wherein the housing includes side walls that extend around an enclosed space and an open front portion that is positioned at the opening formed through the exterior body panel;
   an optical-grade tempered glass panel that is connected to the housing and positioned at the opening that is formed through the exterior body panel;
   an emissive sensor component that is located in the enclosed space that is defined by the housing and the optical-grade tempered glass panel; and
   a receptive sensor component that is located in the enclosed space that is defined by the housing and the optical-grade tempered glass panel.

2. The vehicle of claim 1, wherein:
   a front surface of the optical-grade tempered glass panel is aligned with the exterior body panel,
   the housing is disposed behind the exterior body panel,
   the exterior body panel is a bumper,
   the emissive sensor component is operable to generate an emitted signal and transmit the emitted signal through the optical-grade tempered glass panel,
   the receptive sensor component is operable to detect a received signal that is transmitted through the optical-grade tempered glass panel from an environment, and
   the received signal is a reflected portion of the emitted signal.

3. The vehicle of claim 1, wherein a front surface of the optical-grade tempered glass panel is aligned with the exterior body panel.

4. The vehicle of claim 1, wherein the emissive sensor component is operable to generate an emitted signal and transmit the emitted signal through the optical-grade tempered glass panel.

5. The vehicle of claim 4, wherein the receptive sensor component is operable to detect a received signal that is transmitted through the optical-grade tempered glass panel from an environment.

6. The vehicle of claim 5, wherein the received signal is a reflected portion of the emitted signal.

7. The vehicle of claim 1, wherein the optical-grade tempered glass panel is a laminated structure that includes a first glass layer and a second glass layer that are connected by a transparent interlayer that is located between the first glass layer and the second glass layer.

8. The vehicle of claim 7, wherein the transparent interlayer is formed from polyvinyl butyral.

9. The vehicle of claim 8, wherein:
   a front surface of the optical-grade tempered glass panel is aligned with the exterior body panel,
   the housing is disposed behind the exterior body panel,
   the exterior body panel is a bumper,
   the emissive sensor component is operable to generate an emitted signal and transmit the emitted signal through the optical-grade tempered glass panel,
   the receptive sensor component is operable to detect a received signal that is transmitted through the optical-grade tempered glass panel from an environment, and
   the received signal is a reflected portion of the emitted signal.

10. The vehicle of claim 1, wherein the housing is disposed behind the exterior body panel.

11. The vehicle of claim 1, wherein the exterior body panel is a bumper.

12. The vehicle of claim 1, wherein the optical-grade tempered glass panel is curved.

13. The vehicle of claim 1, further comprising:
    a motion control system that is operable to cause motion based on an output signal from the receptive sensor component.

14. The vehicle of claim 1, further comprising:
    a motion control system that includes a controller and actuators, wherein the controller receives an output signal from the receptive sensor component, the controller makes a motion control decision based on the output signal, and the controller transmits a motion control command to the actuators to cause operation of the actuators.

15. The vehicle of claim 1, wherein the optical-grade tempered glass panel has an Abbe value greater than 63, inclusions less than 0.04 mm2/100 cm3, and at least ninety percent transmittance for at least one wavelength of interest.

16. A method comprising:
    forming an optical-grade glass panel;
    shaping the optical-grade glass panel;
    cutting the optical-grade glass panel;
    tempering the optical-grade glass panel; and
    polishing the optical-grade glass panel subsequent to tempering.

17. The method of claim 16, further comprising:
    installing the optical-grade glass panel in a housing to define a sensor enclosure that has an enclosed space that is defined between the optical-grade glass panel and the housing, wherein an emissive sensor component is located in the enclosed space and a receptive sensor component is located in the enclosed space that is defined by the housing and the optical-grade glass panel.

18. The method of claim 17, further comprising:
installing the sensor enclosure in a vehicle, wherein the vehicle includes a motion control system that includes a controller and actuators, the controller receives an output signal from the receptive sensor component, the controller makes a motion control decision based on the output signal, and the controller transmits a motion control command to the actuators to cause operation of the actuators to control motion of the vehicle.

19. The method of claim 17, wherein the optical-grade glass panel has an Abbe value greater than 63, inclusions less than 0.04 mm2/100 cm3, and at least ninety percent transmittance for at least one wavelength of interest.

20. A method comprising:
forming an optical-grade glass panel;
shaping the optical-grade glass panel;
cutting the optical-grade glass panel;
polishing the optical-grade glass panel prior to tempering; and
tempering the optical-grade glass panel.

21. The method of claim 20, further comprising:
installing the optical-grade glass panel in a housing to define a sensor enclosure that has an enclosed space that is defined between the optical-grade glass panel and the housing, wherein an emissive sensor component is located in the enclosed space and a receptive sensor component is located in the enclosed space that is defined by the housing and the optical-grade glass panel.

22. The method of claim 21, further comprising:
installing the sensor enclosure in a vehicle, wherein the vehicle includes a motion control system that includes a controller and actuators, the controller receives an output signal from the receptive sensor component, the controller makes a motion control decision based on the output signal, and the controller transmits a motion control command to the actuators to cause operation of the actuators to control motion of the vehicle.

23. The method of claim 20, wherein the optical-grade glass panel has an Abbe value greater than 63, inclusions less than 0.04 mm2/100 cm3, and at least ninety percent transmittance for at least one wavelength of interest.

* * * * *